(12) United States Patent
Flanagan et al.

(10) Patent No.: US 6,847,302 B2
(45) Date of Patent: Jan. 25, 2005

(54) OBJECT-PROXIMITY MONITORING AND ALARM SYSTEM

(75) Inventors: Stephen R. Flanagan, Atlanta, GA (US); Daniel B. Thomasson, Santa Rosa, CA (US)

(73) Assignee: SeatSignal, Inc., Atlanta, GA (US)

( * ) Notice: Subject to any disclaimer, the term of this patent is extended or adjusted under 35 U.S.C. 154(b) by 103 days.

(21) Appl. No.: 10/254,492

(22) Filed: Sep. 25, 2002

(65) Prior Publication Data
US 2003/0062996 A1 Apr. 3, 2003

Related U.S. Application Data
(60) Provisional application No. 60/325,852, filed on Sep. 28, 2001.

(51) Int. Cl.[7] .............................................. G08B 21/00
(52) U.S. Cl. ............. 340/666; 340/539.11; 340/539.21; 340/539.23; 177/136; 180/268; 180/271; 180/273; 200/85 A
(58) Field of Search ................................. 340/666, 665, 340/667, 573.1, 572.2, 573.3, 573.4, 539.23, 539.1, 539.13, 539.15, 686.1, 539.11, 539.21, 825.69, 825.72; 180/273, 272, 268, 271; 177/45, 62, 136; 200/85 A

(56) References Cited

U.S. PATENT DOCUMENTS

| 5,289,163 | A | | 2/1994 | Perez et al. | |
|---|---|---|---|---|---|
| 5,581,234 | A | | 12/1996 | Emery et al. | |
| 5,640,145 | A | | 6/1997 | Newham | |
| 5,793,291 | A | | 8/1998 | Thornton | |
| 5,861,808 | A | | 1/1999 | Lehmann et al. | |
| 5,939,988 | A | * | 8/1999 | Neyhart ................... | 340/573.4 |
| 5,948,031 | A | | 9/1999 | Jinno et al. | |
| 5,949,333 | A | | 9/1999 | Lehmann et al. | |
| 5,949,340 | A | | 9/1999 | Rossi | |
| 5,966,070 | A | | 10/1999 | Thornton | |
| 6,104,293 | A | | 8/2000 | Rossi | |
| 6,353,383 | B1 | * | 3/2002 | Gross et al. ............. | 340/425.5 |
| 6,377,177 | B1 | * | 4/2002 | Broussard et al. ....... | 340/573.1 |
| 6,412,813 | B1 | | 7/2002 | Breed et al. | |
| 6,438,476 | B1 | | 8/2002 | Gray et al. | |

FOREIGN PATENT DOCUMENTS

| DE | 4436991 A1 | 4/1996 |
|---|---|---|
| GB | 2248331 A | 4/1992 |

OTHER PUBLICATIONS

U.S. Appl. No. 60/329,692, filed Oct. 11, 2001, Edwards et al.
U.S. Appl. No. 10/011,229, filed Nov. 27, 2001, Edwards et al.
Hines, Michael, "Second Set of Eyes", DailyPress.com, Feb. 10, 2002.

* cited by examiner

*Primary Examiner*—Davetta W. Goins
(74) *Attorney, Agent, or Firm*—Gardner Groff, P.C.

(57) ABSTRACT

A weight-sensitive mat or other sensor determines whether a child seat in a vehicle is occupied, a transmitter is proximate to the sensor, and a keychain fob or other portable unit includes a receiver and an alarm. Generally, if the child seat is occupied and the keychain fob is removed from proximity to the transmitter, the transmitter communicates this to the keychain fob receiver and the alarm is activated. Exemplary embodiments include an add-on kit including a base unit with a transceiver for use with existing car seats having a base and a detachable shell, an add-on kit without the base unit for use with existing unitary car seats, and a car seat with the child sensor, transmitter, and/or base unit built into it.

36 Claims, 8 Drawing Sheets

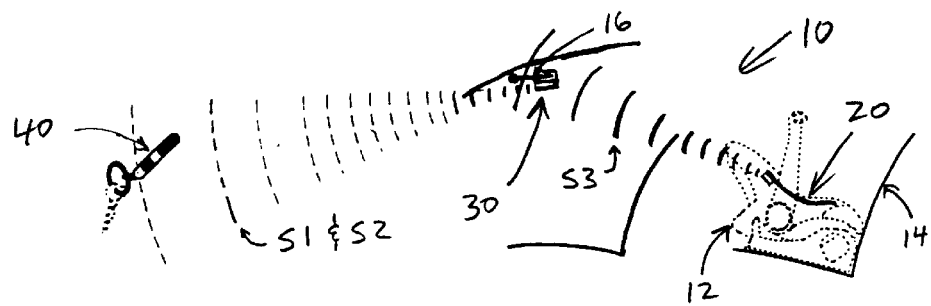
FIG. 1
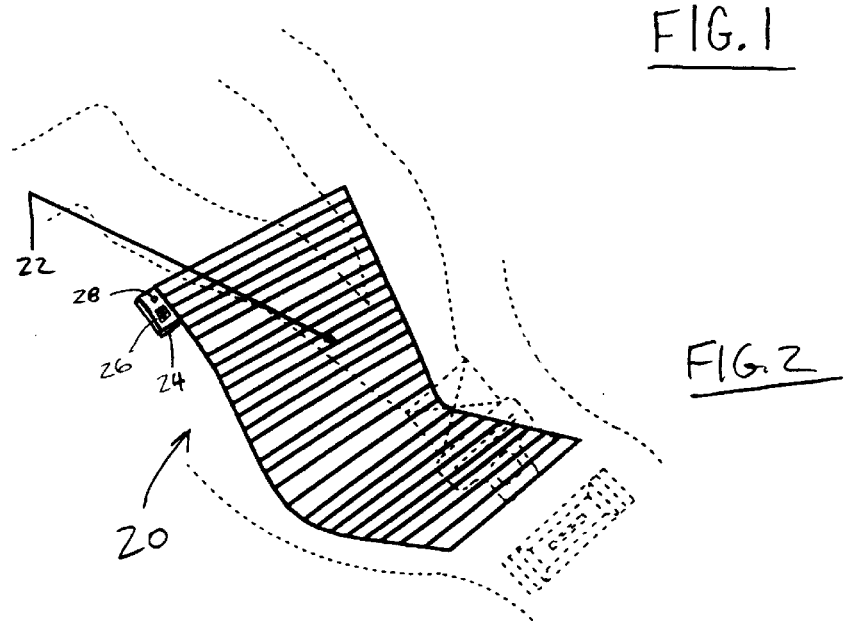
FIG. 2
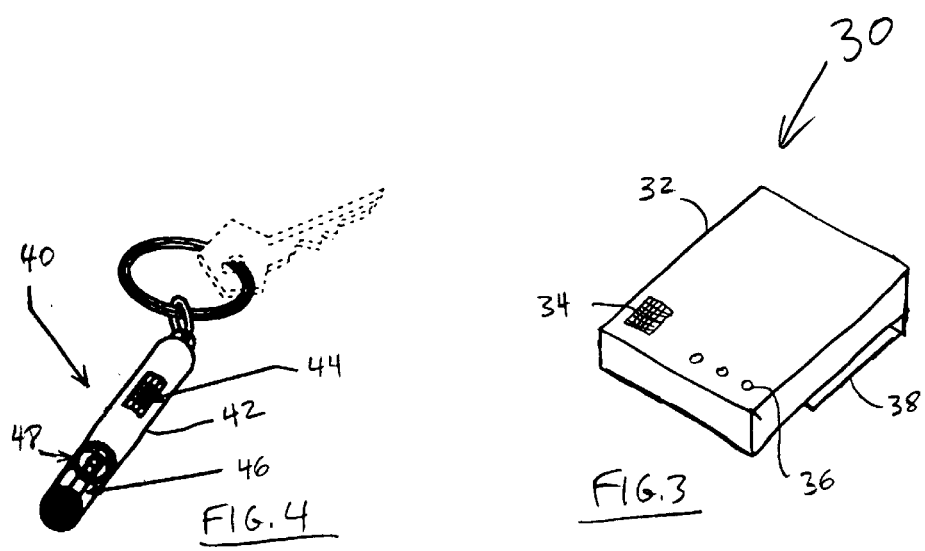
FIG. 3
FIG. 4

US 6,847,302 B2

OBJECT-PROXIMITY MONITORING AND ALARM SYSTEM

CROSS-REFERENCE TO RELATED APPLICATIONS

This application claims the priority benefit of U.S. Provisional Patent Application Ser. No. 60/325,852 filed Sep. 28, 2001, which is hereby incorporated herein by reference in its entirety.

TECHNICAL FIELD

The present invention relates generally to alarm systems for monitoring the proximity of objects and, more particularly, to a system for monitoring the proximity of a child and alerting a parent leaving a vehicle when a child remains in a child seat in the vehicle.

BACKGROUND OF THE INVENTION

Infant car seats are commonly used for safely restraining children when they are driven in motor vehicles. Because of the increased safety they provide, car seat use is now mandated in most, if not all, of the United States. As a result, injuries to infants involved in automobile accidents have decreased over the years.

On occasion, however, using a car seat has resulted in another type of injury to infants. With their child restrained in a rear-facing car seat in the back seat of the car, and with parents busier and more preoccupied than ever, even the most attentive parents could accidentally leave their vehicle while their sleeping child remains in the car seat. The unintentionally abandoned child is then subject to injury from choking, asphyxiation, hyper- or hypothermia, etc. In fact, there have been a disturbingly large number of cases over the last few years of children dying after being accidentally left unattended for too long in their parent's vehicles. By one estimate, more than 150 children died between 1996 and 2001 because they were left in cars unattended.

There are no known devices that satisfactorily overcome this deficiency in the use of conventional car seats. Known car seat-related safety devices include systems for monitoring when the vehicle ignition has been turned off with a child in the car seat in the vehicle, monitoring motion or temperature in the parked vehicle, and monitoring whether the car seat is properly installed. Other known devices include child position and presence monitors. None of these devices, however, have adequately solved the aforementioned problem.

Accordingly, it can be seen that a need remains for a car seat-related safety system that eliminates or at least reduces the likelihood of a parent of other attendant accidentally leaving a vehicle while a child remains in the car seat in the vehicle. In particular, there is needed such a system that warns a parent when unintentionally leaving the child in the car. Additionally, there is needed such a car seat safety system that can be used with existing car seats and one that can be manufactured into new car seats. Furthermore, a need exists for such a car seat safety system that is cost and time efficient to manufacture, install, and use. It is to the provision of a safety system meeting these and other needs that the present invention is primarily directed.

SUMMARY OF THE INVENTION

Generally described, the present invention includes an object-proximity monitoring and alarm system for use with an object carrier. For illustration purposes, the system will be described for use with a child seat securable in a vehicle, though it may be used with strollers or other child carriers. In the child car seat application, the system operates to alert a caretaker if he or she leaves the proximity of a vehicle while the child seat is occupied.

The system includes at least one sensor that determines whether the child seat is occupied, a main transmitter mounted to or in proximity to the child seat, and a portable unit including a receiver and an alarm. The transmitter indicates to the portable unit receiver that the child seat is occupied, as determined by the sensor. If the portable unit is removed from the proximity of the transmitter at a time in which the sensor detects that the seat is occupied, then the portable unit alarm is activated.

In a first exemplary embodiment of the invention, the sensor is provided by a weight-sensitive mat. The mat is placed on top of the seat portion of the child seat or otherwise positioned for sensing the weight of a child. Alternatively, the sensor can be provided by other devices for sensing the presence of a child in the child seat, such a infrared sensors, radio frequency detection devices (e.g., RADAR), photocells, and so forth.

The portable unit is provided by a keychain fob housing the alarm and the receiver. In this way, when a driver leaves the proximity of the vehicle while carrying the fob, the alarm may be activated. The alarm can include a speaker, a light, a vibrator, a combination of these, or another type of alarm mechanism. And the portable unit may be provided in another form such as embedded in a watch or other jewelry, a card or other structure that can be carried in a wallet, a panel with an adhesive side for attaching to an existing keychain fob, and so forth.

The system is configured for the main transmitter to indicate to the receiver when the alarm is to be activated. In one example, the transmitter operates to intermittently transmit a first electromagnetic signal if the child seat is occupied and a second electromagnetic if the child seat ceases to be occupied. The determination of whether the child seat is occupied is made by the sensor. The portable unit receives the first and second electromagnetic signals and, unless one of the second electromagnetic signals is received in the interim, activates the alarm if more than a predetermined length of time passes between successive receptions of the first electromagnetic signal. Also, the first and second signals have a strength that can be received by the portable unit receiver only within a predetermined range. In this way, if a person carrying the fob leaves the proximity of the vehicle while the child seat is occupied, the alarm is activated. Of course, the system can be configured in other ways to accomplish this intended function.

For use with two-piece child seats having a base and a detachable shell, the system may include a base unit mountable to or in proximity to the base and an object detector assembly mountable to or in proximity to the shell. The base unit includes a transceiver comprising the main transmitter and a second receiver, and the object detector assembly includes the sensor and a second transmitter. The object detector assembly includes the sensor and a second transmitter. The second transmitter of the object detector assembly indicates to the second receiver of the base unit transceiver if the child carrier is occupied, as determined by the sensor. For example, the second transmitter may be configured to transmit a third electromagnetic signal to the base unit transceiver if the child carrier is occupied, and the base unit transceiver configured to transmit the first electromagnetic signal only if the third signal is being received. In this way, the car seat base can be left in the vehicle while the shell is removed for carrying the child or for mounting to a base in another car, without activating the alarm.

In the first exemplary embodiment just described, the system may be provided as an add-on kit for use with an existing child seat. To install the system, the sensor mat is placed on the seat portion of the child seat, the transmitter is mounted to or in the proximity of the child seat, and the keychain fob is connected to the user's keychain. The transmitter may be mounted to the child seat base by hook-and-loop fasteners, adhesive strips, screws, or other conventional fasteners, to the vehicle sun visor by a clip or other conventional fastener, or to another component of the vehicle of child seat.

In a second exemplary embodiment of the present invention, the system is arranged for use with a unitary child seat. In this embodiment, there is no need for an indication of whether the shell is mounted to the base because it is not detachable. So the transmitter is provided without the second receiver, that is, a transmitter is provided instead of a transceiver. And the sensor is provided without the second transmitter of the object detector assembly.

For any of these or other embodiments of the invention, the detector assembly, the base unit, and the keychain fob can be provided separately as replacement parts for use with an existing system. In this way, if a person loses his or her keys or damages the base unit, or if the infant repeatedly soils the sensor mat, then the user can purchase only the needed replacement component.

In a third exemplary embodiment of the present invention, the system is arranged to be made and sold integrally with the child seat. In this embodiment, the sensor mat is built into the seat portion of the child seat, or otherwise positioned. Similarly, the transmitter may be built into the base or shell, or included in an object detector assembly with the senor, so that it is not obtrusive.

In a fourth exemplary embodiment, the system includes a sensor provided by a switch configured for determining if a seat belt of the child seat is connected. And in a fifth exemplary embodiment for two-piece child seats, a second sensor can be provided for determining if the shell is mounted to the base and deactivating the system if the shell is detached from the base.

Accordingly, the present invention includes a child-proximity monitoring and alarm system that notifies a parent or other caretaker when about to unintentionally leave a child in a vehicle. Advantageously, the system can be provided as an add-on kit for use with an existing child car seat or it can be built into and provided with a new child seat. In addition, the system can be provided for use with two-piece car seats so that it allows the detachable shell to be removed from the base without setting off the alarm, or it can be provided for use with unitary child seats. Furthermore, the invention includes a portable unit such as a keychain fob and a base unit, each of which can be provided separately as new or replacement parts. Moreover, the various forms of the invention are efficient to manufacture, install, and use, so that they are affordable, reliable, and easy-to-use for average consumers.

These and other features and advantages of the present invention will become more apparent upon reading the following description in conjunction with the accompanying drawing figures.

BRIEF DESCRIPTION OF THE DRAWING FIGURES

FIG. 1 is a schematic diagram of a child-proximity monitoring and alarm system according to a first exemplary embodiment of the invention, showing an object detector assembly on a vehicle child seat, a base unit on a vehicle sun visor, and a keychain fob.

FIG. 2 is a perspective view of the detector assembly of FIG. 1, showing a transmitter and a sensor provided by a weight-sensitive mat.

FIG. 3 is a perspective view of the base unit of FIG. 1, showing a housing for a transceiver.

FIG. 4 is a perspective view of the keychain fob of FIG. 1, showing a housing for a receiver and an alarm.

DETAILED DESCRIPTION OF THE EXEMPLARY EMBODIMENTS

Figure 5:
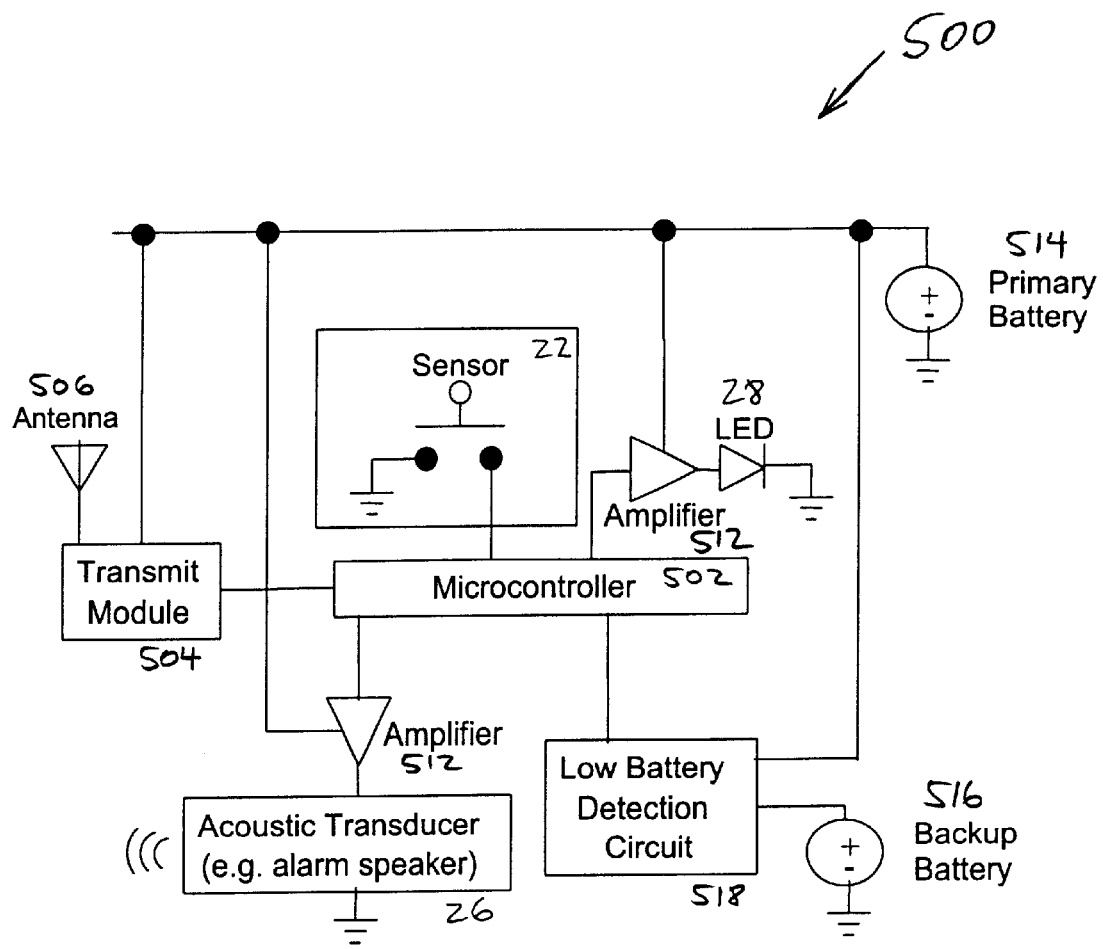
FIG. 5 is a block diagram of the detector assembly of FIGS. 1 and 2.

Referring now to the drawing figures, wherein like reference numerals represent like parts throughout the several views, the present invention includes an object-proximity monitoring and alarm system for use with object carriers. The system can be used with child car seats, strollers, cribs, child bicycle seats, or other child carriers. For purposes of illustrating its features and benefits, however, several exemplary embodiments of the system are described herein in use with vehicle child seats. In these embodiments, the system warns a caretaker if he or she leaves the proximity of a vehicle while a child is still in a car seat in the vehicle.

FIGS. 1–10 illustrate a first exemplary embodiment of the present invention, referred to generally as the system 10. As shown in FIGS. 1–4, the system 10 includes a detector assembly 20, a base unit 30, and a portable unit 40. The detector assembly 20 is placed upon, mounted to, built into, or otherwise arranged to determine whether a child seat 12 on a seat 14 in a vehicle is occupied. The base unit 30 is mounted to a driver's side sun visor 16 of the vehicle, mounted to or built into the child seat itself, or otherwise arranged to receive transmissions from the detector assembly 20. And the portable unit 40 is carried by the caretaker of the child and receives transmissions from the base unit 30.

The detector assembly 20 includes at least one sensor 22 that determines whether the child seat is occupied and transmits a first proximity-sensitive indication when the child seat is occupied. The base unit 30 receives the first proximity-sensitive indication when the child seat is occupied and, in response, relays a second proximity-sensitive indication that the child seat is occupied. The portable unit 40 includes an alarm 44, receives the second proximity-sensitive indication that the child seat is occupied, and, in response, alerts the user if the portable unit is removed from proximity to the base unit.

The detector assembly 20 transmits the first proximity-sensitive indication with a strength so that it can only be received by the base unit 30 within a first predetermined proximity range. And the base unit 30 transmits the second proximity-sensitive indication with a strength so that it can only be received by the portable unit 40 within a second predetermined proximity range. For example, in a typical commercial embodiment the first predetermined proximity range is about 2–3 meters and the second predetermined proximity range is about 5–10 meters.

In this configuration, the system 10 can be provided as an add-on kit for use with a two-piece child seat having a base and a detachable shell. If the shell of the child seat is removed from the base farther than the first predetermined proximity range, then the portable unit alarm will not activate. So the user can remove the shell to carry the child around and/or install the shell on the base in another vehicle without activating the alarm. Or the system can be used with a unitary child seat so that it can be removed from a vehicle without activating the alarm.

Referring to FIGS. 1 and 2, the detector assembly sensor 22 is provided by a weight-sensitive liner mat. Such mats are known in the art and sometimes used as training devices for pets. One known pet training device is the commercially available SOFA SCRAM mat that is placed on a sofa and that beeps shrilly when a pet jumps up onto mat, thereby dissuading pets from getting up on furniture. In the detector assembly sensor 22, the sensor mat 22 is sized and shaped to fit onto the seat portion of the child seat 12. For example, in a typical commercial embodiment the mat is generally rectangular and about 30×30×1 cm. The mat can be made of a variety of materials, but preferably it is sufficiently flexible that it will fit onto most or all existing child seats and it has an outer lining made of a non-porous material that protects against spills. Also, in order to keep the mat secured in place on the child seat 12, it can be provided with hook-and-loop fasteners, straps, snaps, or other conventional fasteners.

Alternatively, the sensor 22 can be provided by other devices for sensing the presence of a child in the child seat 12. For example, the sensor can be provided by infrared sensors or photocells in combination with a light source that is blocked upon the child sitting in the seat, radio frequency detection devices such as RADAR, and/or other devices for sensing the presence of the child by means such as pressure, capacitance, conductance, temperature, etc. Or the aforementioned weight-sensitive mat can be sized and shaped for fitting under and supporting the weight of the entire child seat or of the detachable shell of the child seat.

In addition to the sensor 22, the detector assembly 20 includes a communication and control system for communicating with the base unit 30, the components and operation of which are described in detail with reference to FIGS. 5 and 6. The communication and control system is enclosed in a housing 24 which may have an alarm speaker 26 and one or more indicator lights 28. Preferably, the housing 24 is flat and thin and attached to the sensor 22 at an unobtrusive location. For example, in a typical commercial embodiment the housing 24 is about 3×3×1 cm, about the same thickness as the sensor mat 22. Or the housing 24 can be provided separately and connected to the sensor 22 by wires, or it can be otherwise sized and shaped, if so desired.

Referring to FIGS. 1 and 3, the base unit 30 includes a communication and control system for communicating with the detector assembly 20 and the portable unit 40, the components and operation of which are described in detail with reference to FIGS. 7 and 8. The system is enclosed in a housing 32 which may have an alarm speaker 34 and one or more indicator lights 36 similar to those of the detector assembly 20. Also, the housing 32 may have a clip 38 for removably attaching the base unit 30 to a vehicle sun visor, or it may be provided with adhesive strips, screws, straps, or other fasteners for attaching it to the child seat or another part of the vehicle. In a typical commercial embodiment the base unit 30 is about 5×5×1 cm.

Referring to FIGS. 1 and 4, the portable unit 40 is provided by a keychain fob for attachment to a keychain ring carrying keys. The fob 40 includes a housing 42 which may have an alarm speaker 44 and one or more indicator lights 46 similar to those of the detector assembly 20 and/or the base unit 30. In addition, the fob 40 has a disable switch 48 for manually disabling the system 10. And the fob housing 42 encloses a communication and control system for communicating with the base unit 30, the components and operation of which are described in detail with reference to FIGS. 9 and 10. The alarms 44 can include a speaker, a flashing light, a vibrator, a combination of these, or another type of alarm. In a typical commercial embodiment the fob housing 42 is about 5×5×1 cm.

Alternatively, the portable unit 40 may be embodied in other forms. For example, the components of the portable unit 40 can be embedded in a watch, other jewelry, a smart card, another structure that can be carried in a wallet, or a cell phone, personal digital assistant, or other portable electronic device. Or the portable unit 40 may be provided by a panel with an adhesive side for attaching to an existing keychain fob.

Turning now to FIGS. 5–10, the structure and operation of the communication and control systems for the detector assembly 20, the base unit 30, and the portable unit 40 will now be described. These components communicate by short-range wireless signals such as radio frequency (RF) signals using wireless communications software such as BLUETOOTH. The RF signals are broadcast as pulses of time chosen to accommodate the battery needs and information required. Each RF signal has a carrier wave modulated by an information signal. The modulation type could include frequency modulation (FM), amplitude modulation (AM), and phase modulation (IQ). Other modulation schemes are possible and limited only to practical considerations.

In the information transmission scheme of the first exemplary embodiment, each pulse contains sufficient bits of information (upon demodulation and analog-to-digital conversion) to indicate "monitoring signal 1" (S1) or "disable signal 2" (S2) transmitted from the base unit 30 and "active signal 3" (S3) transmitted from the detector assembly 20 (see FIG. 1), and a number of bits which comprise a "privacy code". The privacy code is assigned to each transmitter-receiver pair. Additional encoding could also include error checking and redundant bits for interference tolerance.

FIG. 5 shows the communication and control system 500 for the detector assembly 20. The detector assembly 20 sends to the base unit 30 the first proximity-sensitive indication that the sensor 22 is activated by a child in the car seat 12. This indication may be provided by a variety of different systems 500 implementing a variety of different indication schemes.

In the first exemplary embodiment, the communication and control system 500 includes the sensor 22, a microcontroller 502, a transmitter 504, an antenna 506, and various output and power supply components. The output and power supply components include the acoustic transducer 26 such as an alarm speaker or piezoelectric buzzer, the indicator lights such as LEDs 28, amplifiers 512 for the acoustic transducer 26 and the LEDs 28, a primary power source 514 such as one or more batteries, a backup power source 516 such as one or more batteries, and a low battery detection circuit (LBDC) 518.

The sensor 22 senses the presence of a child in the car seat and produces a logical voltage that can be interpreted by the microcontroller 502 to indicate the presence or absence of the child. The microcontroller 502 implements the combinational and sequential functions that control the timing and states of the output components (e.g., transmitter 504, alarm 26, LEDs 28, etc.) based on the input components (e.g., sensor 22, LBDC 518, etc.). Depending on the capability of available sensors, the microcontroller may not be needed for the detector assembly 20.

The transmitter 504 converts the logical voltages from the microcontroller 502 to modulated, analog, active signal S3, which is transmitted on the antenna 506. The transmitter 504 transmits the active signal S3 to the base unit 30 over a first predetermined proximity range of a short distance, for example, 2–3 meters, if and only if the child is detected by the sensor 22 in the car seat.

In addition, the microcontroller 502 sends electrical signals to the acoustic transducer 26, the LED indicator lights 28, and/or other output components. The acoustic transducer 26 converts the electrical signal to an audible sound and the LED indicator lights 28 are illuminated when activated. Amplifiers 512 are provided, if needed, to convert (buffer) a low-power logical signal to a powered signal sufficient to drive the alarm speaker 26 or the LEDs 28. Upon receiving an electrical signal from the microcontroller 502, one of the LEDs 28 indicates the off-state (LED off), on-state (LED on), and low battery state (LED blinking). Upon receiving another electrical signal from the microcontroller 502, the alarm speaker 26 sounds to indicate that the batteries are low.

The primary battery 514 delivers power to all active components except the LBDC 518, which is powered by the backup battery 516. The batteries 514 and 516 may be consist of single or multiple power cells in series or parallel, may be provided by conventional AA, D-cell, or other batteries, depending on operational lifetime and power requirements. In this embodiment, the power requirements are based on a low power RF transmission (e.g., <10 mW), and very low standby current (e.g., <1 mA). In addition, the LBDC 518 measures the power (e.g., via voltage) remaining in the primary battery 514 and outputs a logical value to the microcontroller 502 to indicate if the battery voltage is above or below a predefined "low battery" threshold voltage. If the primary battery is "low" then the microcontroller 502 sends the signals to sound the speaker alarm 26 and to blink the LED 514, as described above. The backup batteries 516 can then be used to operate the system 500, allowing some time for the user to replace or recharge the batteries 514 and 516.

Figure 6:
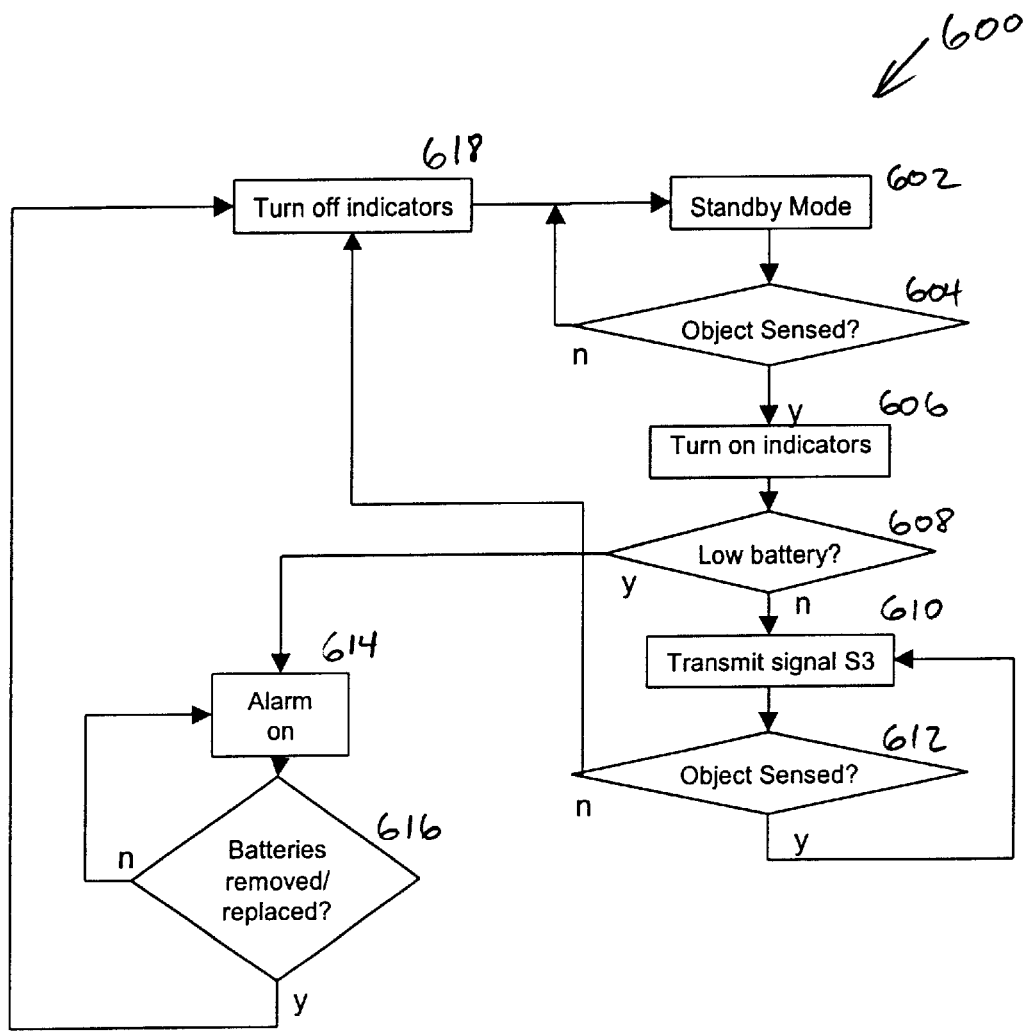
FIG. 6 is a flow diagram of the operation of the detector assembly of FIG. 5.

Referring additionally to FIG. 6, there is shown the operational process flow 600 of the communication and control system 500 of the detector assembly 20. At 602, in the standby mode, the system 500 consumes minimal power and transmits no signals. In this state, at 604, the detector assembly 20 checks for the presence of a child in the car seat 12. If a child is detected, the transmission sequence begins, if not, the standby loop continues.

At 606, the transmission sequence begins. First, one of the LED indicators 28 is turned on. The state of the indicator light 28 (steady or blinking) is determined by the LBDC 518 and is controlled by the microcontroller 502. Then at 608, the LBDC 518 checks to see if the primary battery 514 has fallen below the acceptable voltage threshold. If it has, the alarm sequence is initiated at 614, if not, the transmission sequence continues. Next, at 610 the short-range active signal S3 is transmitted over the first predetermined proximity range. If the sensor 22 continues to detect the child, the signal S3 transmission loop continues, but if not, then the transmission sequence is ended at 618.

If at 608 the LBDC 518 determined that the primary battery 514 power was low, then at 614 the alarm sequence is initiated. In the alarm sequence, the alarm 26 is turned on, then at 616 the LBDC 518 rechecks the voltage of the primary batteries 514. If the primary batteries 514 have been replaced or recharged so that the voltage is now above the minimum acceptable threshold, then the alarm 26 is turned off and the alarm sequence is ended at 618. If not, then the alarm loop continues.

Upon the termination of the transmission sequence from 612, and upon the termination of the alarm sequence from 616 (if it was activated), the LED indicator 28 is turned off and the system 500 is returned to the standby loop at 602. The operational process flow 600 of the system 500 continues in this way, awaiting the next time a child is sensed in the car seat 12.

Figure 7:
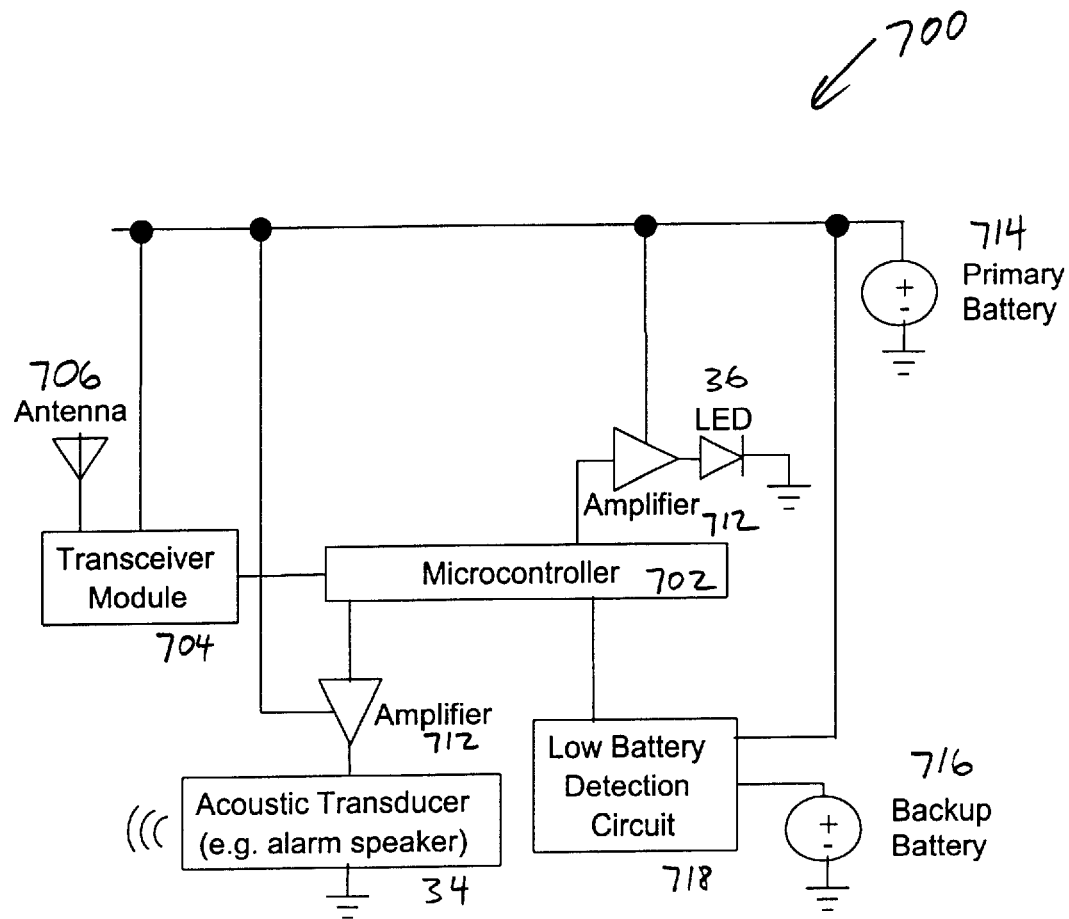
FIG. 7 is a block diagram of the base unit of FIGS. 1 and 3.

FIG. 7 shows the communication and control system 700 for the base unit 30. The base unit 30 receives from the detector assembly 20 the first proximity-sensitive indication that the sensor 22 is activated by a child in the car seat 12, but only receives the first indication when the base unit 30 and the detector assembly 20 are close together within the first predetermined proximity range. Then the base unit 30 transmits a second proximity-sensitive indication to the portable unit 40 that the sensor 22 is activated by a child in the car seat 12, but only sends the second indication when the first indication is being received from the detector assembly 20. This second indication may be provided by a variety of different systems 700 implementing a variety of different indication schemes.

In the first exemplary embodiment, the communication and control system 700 includes a microcontroller 702, a transceiver 704, an antenna 706, and various output and power supply components. The output and power supply components include the acoustic transducer 34 such as an alarm speaker or piezoelectric buzzer, the indicator lights such as LEDs 36, amplifiers 712 for the acoustic transducer 34 and the LEDs 36, a primary power source 714 such as one or more batteries, a backup power source 716 such as one or more batteries, and a low battery detection circuit (LBDC) 718.

The microcontroller 702 implements the combinational and sequential functions that control the timing and states of the output components (e.g., transceiver 704, alarm 34, LEDs 36, etc.) based on the input components (e.g., transceiver 704, LBDC 718, etc.). The transceiver 704 converts the modulated, analog, low-magnitude active signal S3 received from the detector assembly transmitter 504 to demodulated, buffered, logical voltage signals read by the microcontroller 702, and converts logical voltages from the microcontroller 702 to modulated monitoring and disable signals S1 and S2 to be transmitted on the antenna 706. The transceiver 704 transmits the monitoring signal S1 to the portable unit 40 over a second predetermined proximity range of a medium distance, for example, 5–10 meters, if and only if the child is detected by the sensor 22 in the car seat 12 and the base unit 40 and the detector assembly 20 are within the first predetermined proximity range. If the base unit 40 and the detector assembly 20 are not within the first predetermined proximity range and/or the child is no longer detected by the sensor 22 in the car seat 12 so that the base unit transceiver 704 does not receive the active signal S3, then the transceiver 704 transmits the disable signal S2 to the portable unit 40. It will be understood that the transceiver 704 may be provided by a conventional receiver and transmitter, by a conventional transceiver with shared components such as the antenna, or otherwise.

In addition, the microcontroller 702 sends electrical signals to the acoustic transducer 34, the LED indicator lights 36, and/or other output components. The acoustic transducer 34 converts the electrical signal to an audible sound and the LED indicator lights 36 are illuminated when activated. Amplifiers 712 are provided, if needed, to convert (buffer) a low-power logical signal to a powered signal sufficient to drive the alarm speaker 34 or the LEDs 36. Upon receiving an electrical signal from the microcontroller 702, one of the LEDs 36 indicates the off-state (LED off), on-state (LED on), and low battery state (LED blinking). Upon receiving another electrical signal from the microcontroller 702, the alarm speaker 34 sounds to indicate that the batteries are low.

The primary battery 714 delivers power to all active components except the LBDC 718, which is powered by the backup battery 716. The batteries 714 and 716 may consist of single or multiple power cells in series or parallel, may be provided by conventional AA, D-cell, or other batteries, depending on operational lifetime and power requirements. Alternatively, the base unit may be provided with a cord and jack for connecting to the cigarette lighter socket and running off the vehicle's 12 vDC power system. In the present embodiment, the power requirements are based on a medium power RF transmission (e.g., <100 mW), and very low standby current (<1 mA). To improve battery efficiency, the first and second signals S1 and S2 may be transmitted as pulses (e.g., <1 s) at intervals (e.g., 1–2 minutes apart).

In addition, the LBDC 718 measures the power (e.g., via voltage) remaining in the primary battery 714 and outputs a logical value to the microcontroller 702 to indicate if the battery voltage is above or below a predefined "low battery" threshold voltage. If the primary battery is "low" then the microcontroller 702 sends the signals to sound the speaker alarm 34 and to blink the LED 36, as described above. The backup batteries 716 can then be used to operate the system 700, allowing some time for the user to replace or recharge the batteries 714 and 716.

Figure 8:
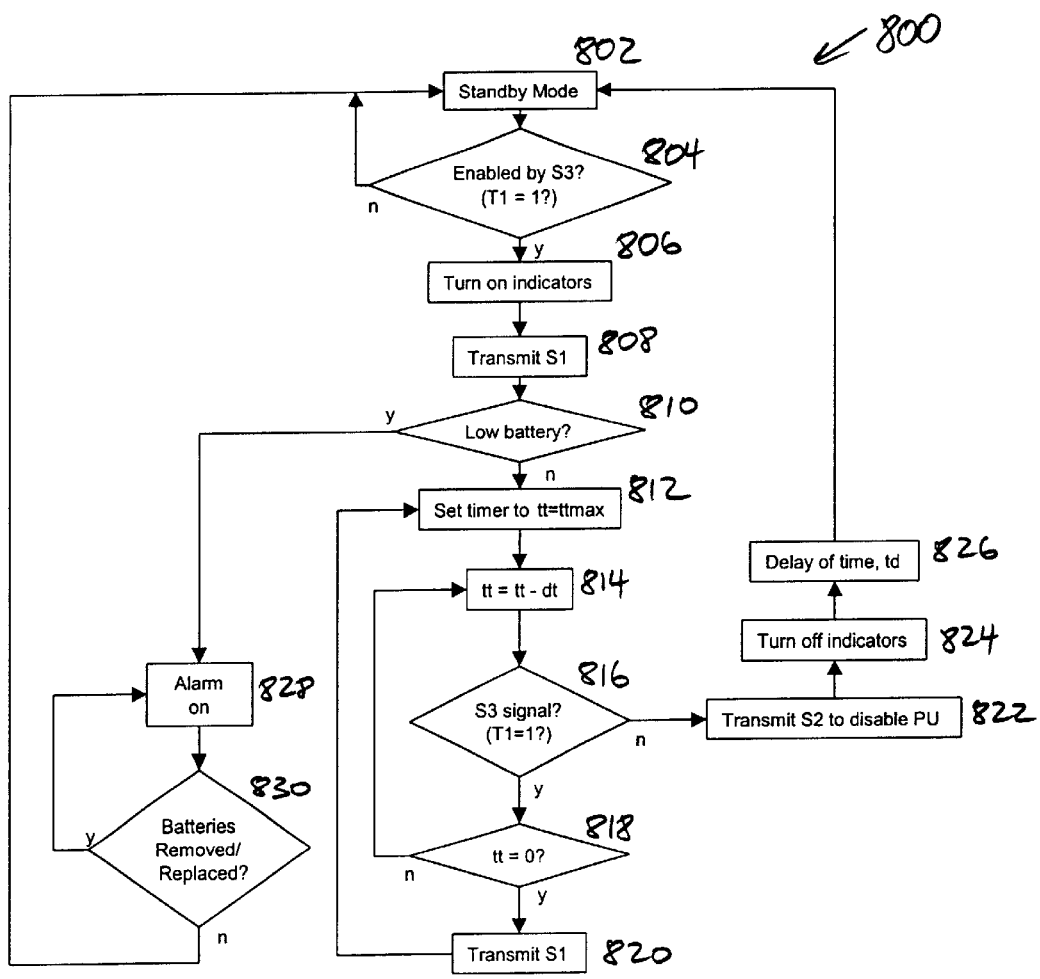
FIG. 8 is a flow diagram of the operation of the base unit of FIG. 7.

Referring additionally to FIG. 8, there is shown the operational process flow 800 of the communication and control system 700 of the base unit 30. At 802, in standby mode, the system 700 consumes minimal power and transmits no signals. In this state, at 804, the microcontroller 702 checks for T1=1. If the active signal S3 is received by the transceiver 704 from the detector assembly transmitter 504, logical bit T1 is set to "1." If this occurs, the base unit 30 is enabled and the transmission sequence begins. If not, then the standby loop continues.

At 806, the transmission sequence begins. First, one of the LED indicators 36 is turned on. The state of the indicator light 36 (steady or blinking) is determined by the LBDC 718 and is controlled by the microcontroller 702. Then at 808, the transceiver 704 begins transmitting the monitoring signal S1. Next, at 810, the LBDC 718 checks to see if the primary battery 714 has fallen below the acceptable voltage threshold. If it has, the alarm sequence is initiated at 828, if not, then the transmission sequence continues.

The transmission sequence continues at 812 with the initiation of the transmission timing loop. The microcontroller 702 includes or is connected to a transmission timer, which is set to the time interval "ttmax." The time interval "ttmax" is the time period between monitoring signal S1 transmission pulses, assuming no disable signal S2 is received in the interim. To allow for the portable unit 30 to be reset/disabled before the portable unit alarm is inadvertently activated, and given that the maximum allowed time period between reception of monitoring signal S1 transmission pulses by the portable unit receiver is "trmax," the time interval "ttmax" is preferably much less than the time interval "trmax." For instance, if the time interval "trmax" is set to about 7 minutes, then the time interval "ttmax" could be set to about 1 minute. Of course, other time intervals can be used with good results.

Next, at 814 the transmission timer time "tt" decrements by "dt," and does so each time through the transmit timing loop. The decrement of time "dt" may be chosen to calibrate the timer cycle timing to real time. At 816, the microcontroller 702 checks to see if logical bit T1=1. If the active signal S3 is still being received by the transceiver 704 from the detector assembly transmitter 504, indicating that the detector assembly sensor 22 still detects a child in the car seat 12 and that the car seat is still within the first proximity range of the base unit 30, then T1=1. If T1=1, then the transmit timing loop continues. If not, then T1=0, and the disable sequence begins at 822.

At 818, if the monitoring signal S1 transmission time interval "ttmax" has not elapsed, then at 814 the transmission timer time "tt" again decrements by "dt," with this timing sub-loop continuing until the time interval "ttmax" elapses. If the monitoring signal S1 transmission time interval "ttmax" has elapsed, then at 820 the medium-range monitoring signal S1 is transmitted by the transceiver 704 over the second predetermined proximity range, and the transmission timing loop is reset and restarted at 812.

If at 816 the active signal S3 reception ceases, indicating that the detector assembly 20 is beyond the first proximity range of the base unit 40, that the child is no longer in the car seat 12, or both, then the disable sequence begins at 822. In the disable sequence, the transceiver transmits the disable S2 signal to disable the portable unit, assuming it is within range. Accordingly, in order to avoid false alarms, the transceiver 704 sends the disable signal S2 over a third predetermined proximity range that is greater than the second predetermined proximity range. Then at 824 the indicators 36 are returned to the standby state. And at 826 the system 700 waits for a predetermined time delay "td" to allow time for any erratic active signals S3 from the sensor 22 during removal of the child from the car seat 12. Then the system 700 returns to the standby mode at 802.

If at 810 the LBDC 718 determined that the primary battery 714 power was low, then at 828 the alarm sequence is initiated. In the alarm sequence, the alarm 34 is turned on, then at 830 the LBDC 718 checks the voltage of the primary batteries 714. If the primary batteries 714 have been replaced or recharged so that the voltage is now above the minimum acceptable threshold, then the alarm 34 is turned off and the alarm sequence is ended. If not, then the alarm loop continues.

Upon the termination of the disable sequence from 826, and upon the termination of the alarm sequence from 830 (if it was activated), the system 700 is returned to the standby loop at 802. The operational process flow 800 of the system 500 continues in this way, awaiting the next time the active signal S3 is received by the transceiver 704.

Figure 9:
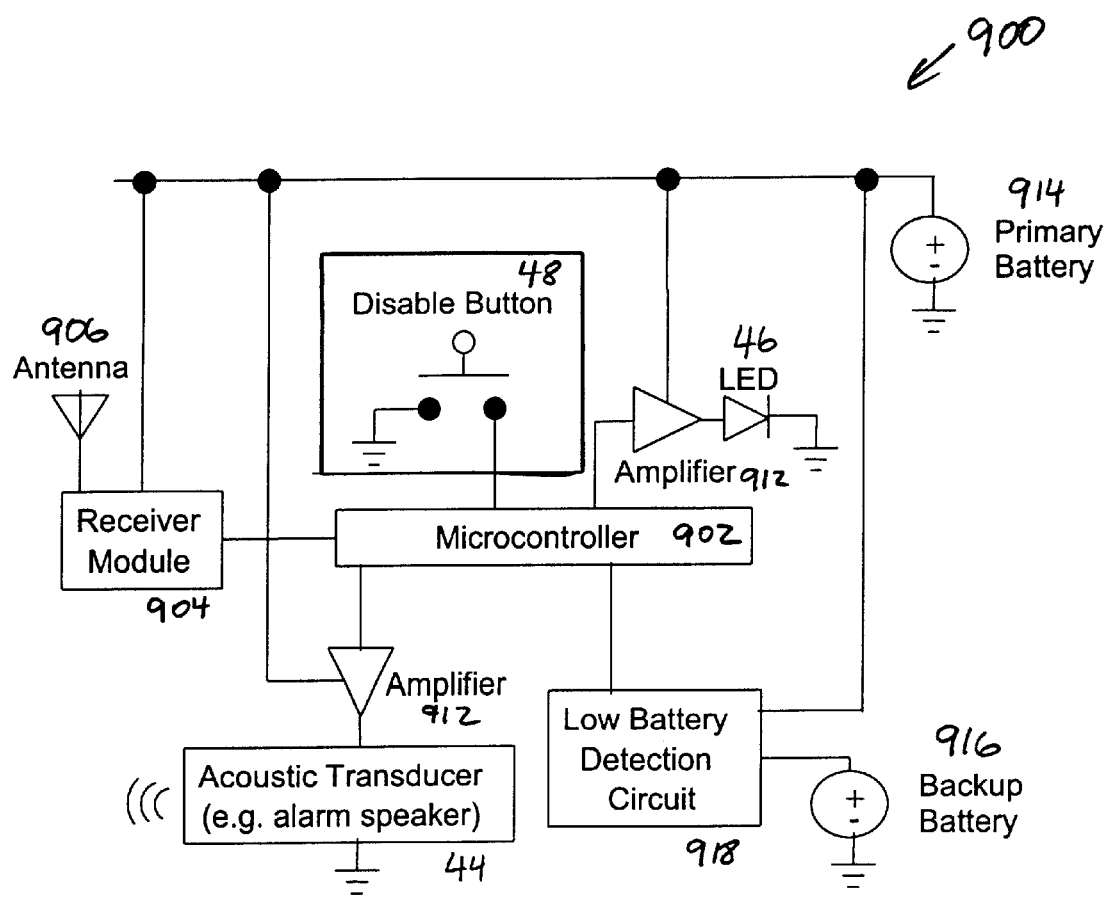
FIG. 9 is a block diagram of the keychain fob of FIGS. 1 and 4.

FIG. 9 shows the communication and control system 900 for the portable unit 40. The the portable unit 40 receives from the base unit 30 the second proximity-sensitive indication that the sensor 22 is activated by a child in the car seat 12, but only receives the second indication when the portable unit 40 and the base unit 30 are close together within the second predetermined proximity range. If the child seat 12 is occupied and is within the first proximity range of base unit 30 and the portable unit 40 is moved beyond the second proximity range of the base unit 30, then the portable unit alarm is activated to notify the caretaker he or she is about to leave the child in the car. This alarm activation may be provided by a variety of different systems 900 implementing a variety of different schemes.

In the first exemplary embodiment, the communication and control system 900 includes the disable switch 48, a microcontroller 902, a receiver 904, an antenna 906, and various output and power supply components. The output and power supply components include the acoustic transducer 44 such as an alarm speaker or piezoelectric buzzer, the indicator lights such as LEDs 46, amplifiers 912 for the acoustic transducer 44 and the LEDs 46, a primary power source 914 such as one or more batteries, a backup power source 916 such as one or more batteries, and a low battery detection circuit (LBDC) 918.

The manual disable switch 48 is a toggle switch, pushbutton, or other conventional switch that is operated by the user to disable the system 10 if the need arises. Such instances might include when a parent intentionally leaves a child in the car with another adult or an older sibling, when the parent takes the keys out of the ignition to pump and pay for gas with the child in the car, and so forth. The disable switch can be provided by, for example, a momentary switch, the momentary depression of which connects the microcontroller 902 to ground to disable the portable unit 40. Alternatively, the disable switch 48 may be provided in the base unit 30, configured in other ways to disable the system 10, or both.

The microcontroller 902 implements the combinational and sequential functions that control the timing and states of the output components (e.g., alarm 44, LEDs 46, etc.) based on the input components (e.g., disable switch 48, receiver 904, LBDC 918, etc.). The receiver 904 converts the modulated, analog, low-magnitude monitoring and disable signals S1 and S2 received on the antenna 906 from the base unit transceiver 704 to demodulated, buffered, logical voltage signals read by the microcontroller 902. The portable unit receiver 904 receives the monitoring signal S1 from the base unit transceiver 704 only within the second predetermined proximity range. But it does so if and only if the child is detected by the sensor 22 in the car seat 12 and the detector assembly 20 is within the first predetermined proximity range of the base unit 30. If the base unit 30 and the detector assembly 20 are not within the first predetermined proximity range and/or the child is no longer detected by the sensor 22 in the car seat 12, then the portable unit receiver 904 instead receives the disable signal S2 from the portable base unit transceiver 704, and the system 10 becomes disabled.

In addition, the microcontroller 902 sends electrical signals to the acoustic transducer 44, the LED indicator lights 46, and/or other output components. The acoustic transducer 44 converts the electrical signal to an audible sound and the LED indicator lights 46 are illuminated when activated. Amplifiers 912 are provided, if needed, to convert (buffer) a low-power logical signal to a powered signal sufficient to drive the alarm speaker 44 or the LEDs 46. Upon receiving an electrical signal from the microcontroller 902, one of the LEDs 46 indicates the off-state (LED off), on-state (LED on), and low battery state (LED blinking). Upon receiving another electrical signal from the microcontroller 902, the alarm speaker 44 sounds to indicate that the batteries are low.

The primary battery 914 delivers power to all active components except the LBDC 918, which is powered by the backup battery 916. The batteries 914 and 916 may be consist of single or multiple power cells in series or parallel, may be provided by conventional AA, D-cell, or other batteries, depending on operational lifetime and power requirements. In the present embodiment, the power requirements are based primarily on the loudness or other intensity characteristic of the alarm 44, and on very low standby current (<1 mA).

In addition, the LBDC 918 measures the power (e.g., via voltage) remaining in the primary battery 914 and outputs a logical value to the microcontroller 902 to indicate if the battery voltage is above or below a predefined "low battery" threshold voltage. If the primary battery is "low" then the microcontroller 902 sends the signals to sound the speaker alarm 44 and to blink the LED 46, as described above. The backup batteries 916 can then be used to operate the system 900, allowing some time for the user to replace or recharge the batteries 914 and 916.

Figure 10:
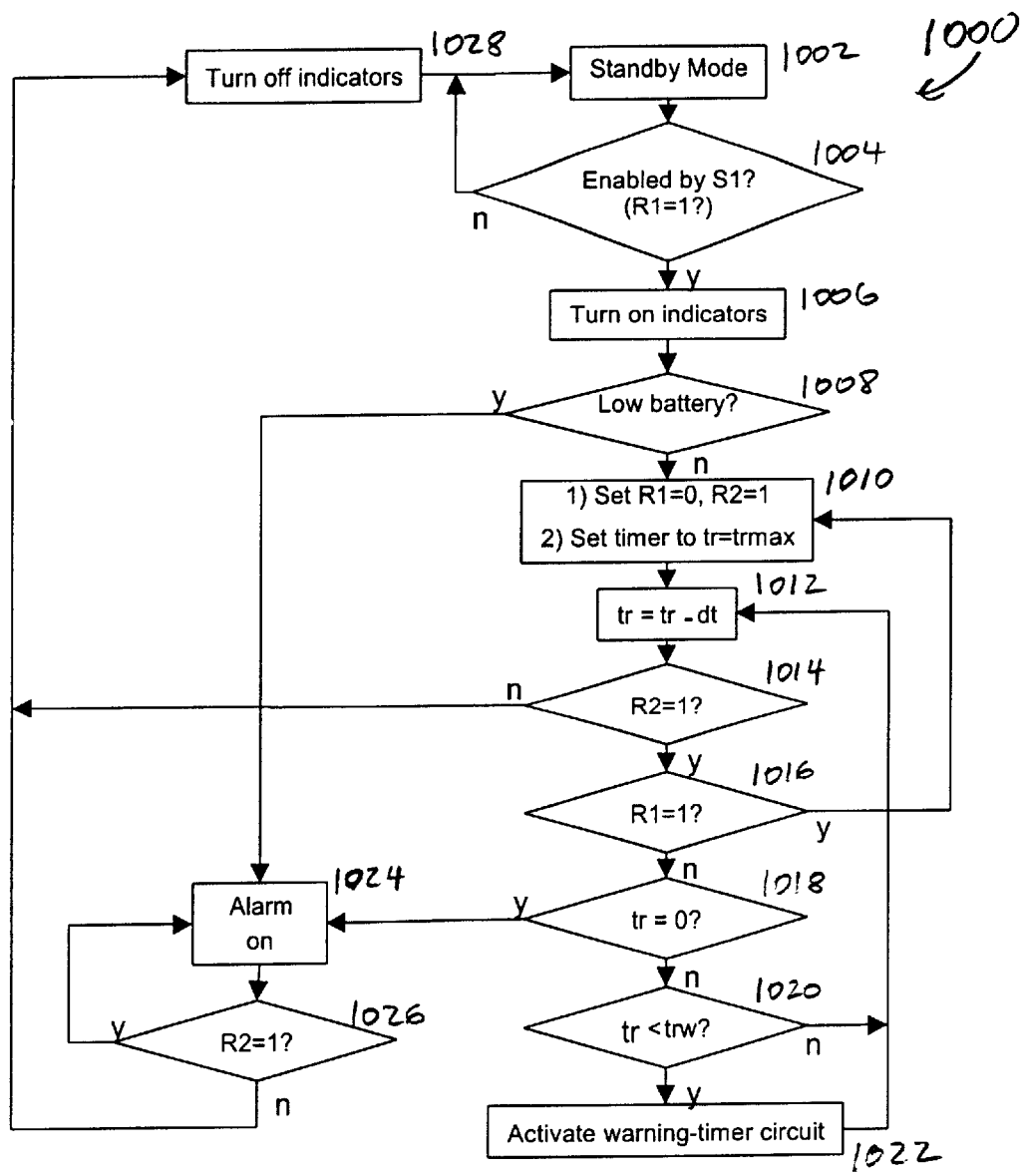
FIG. 10 is a flow diagram of the operation of the keychain fob of FIG. 9.

Referring additionally to FIG. 10, there is shown the operational process flow 1000 of the communication and control system 900 of the portable unit 40. At 1002, in the standby mode, the receiver 904 merely waits, in a standby loop, to be activated by its receiving of the monitoring signal S1. In this mode, at 1004, if the receiver 904 detects the monitoring signal S1 from the transceiver 704, logical bit R1 is set to "1." When this occurs, the standby loop is broken and the portable unit 40 becomes active and the reception timing sequence begins. If not, then the standby loop continues.

At 1006, the reception sequence begins. First, one of the LED indicators 46 is turned on. The state of the indicator light 46 (steady or blinking) is determined by the LBDC 918 and is controlled by the microcontroller 902. Then at 1008, the LBDC 918 checks to see if the primary battery 914 has fallen below the acceptable voltage threshold. If it has, the alarm sequence is initiated at 1024, if not, then the reception sequence continues.

The reception sequence continues at 1010 with the initiation of the reception timing loop. To start the reception timing loop, logical bits R1 and R2 are set to "0" and "1,"respectively. Logical bits R1 and R2 are the flags that reset or end the subsequent loops if the monitoring signal S1 or the disable signal S2 is received from the transceiver 704 or the disable switch 48 is operated. Accordingly, reception of the monitoring signal S1 resets R1=1. And reception of the disable signal S2 or operation of the disable switch 48 sets R2=0.

In addition, the microcontroller 902 includes or is connected to a reception timer, which is set to the time interval "trmax." The time interval "trmax" is the maximum allowed time period between reception of monitoring signal S1 pulses, assuming no disable signal S2 is received in the interim. As mentioned above, to allow for the portable unit 30 to be reset/disabled before the portable unit alarm 44 is inadvertently activated, the monitoring signal S1 transmission time interval "ttmax" is preferably much less than the time interval "trmax." Thus, setting the time interval "ttmax" to about 1 minute and the time interval "trmax" to about 7 minutes provides good results. Of course, other time intervals can be used with similarly good results.

Next, at 1012 the reception timer time "tr" decrements by "dt" each time through the reception timing loop. The decrement of time "dt" may be chosen to calibrate the timer cycle timing to real time.

Then at 1014, the microcontroller 902 checks to see if the logical bit R2=1. The logical bit R2, initially set to "1," is changed to "0" upon reception of the disable signal S2 or upon operation of the disable switch 48. So if the logical bit R2 is still set to "1," then the sensor 22 still detects the child in the car seat 12, the detector assembly 20 is still within the first proximity range of the base unit 30, and the user has not operated the manual disable switch 48. In this case, the reception timing loop continues. If not, and the logical bit R2 has been changed to "0," then the system 900 returns to the standby mode and has been effectively disabled.

At 1016 the reception timing loop continues from 1014. The microcontroller 902 checks to see if the logical bit R1=1. The logical bit R1, initially set to "0," is changed to "1" upon reception of the monitoring signal S1. So if the logical bit R1 has been changed to "1," then the portable unit 40 is within the second proximity range of the base unit 30 and the reception timing loop continues at 1010. If not, and the logical bit R1 is still set to "0," then the reception timing loop continues.

At 1018 the reception timing loop continues from 1016. The microcontroller 902 checks to see if the maximum allowed time "trmax" has elapsed. If it has, that is, if the reception timer time "tr" has decremented from "trmax" all the way down to "0" without a monitoring signal S1 being received, then the alarm sequence begins at 1024. This is the sequence for operating the alarm 44 to warn the caretaker that he or she is about to leave the child in the vehicle. If the maximum allowed time "trmax" has not elapsed, and time remains before the reception timer time "tr" decrements to "0," then the reception timing loop continues.

At 1020 the reception timing loop continues from 1018. The microcontroller 902 checks to see if the reception timer time "tr" has decremented down to a warning time "trw." The warning time "trw" is set to be less than the maximum allowed time "trmax" and more than zero, so that as the timer approaches zero the alarm 44 sounds a warning. The warning can be a short chirping sound every 30 seconds or another type of alert with a lower intensity than the full alarm. Thus, if the reception timer time "tr" has not elapsed down to the warning time "trw," then it continues to decrement at 1012. But if the reception timer time "tr" has decremented down past the warning time "trw," then at 1022 the warning timer begins (this timing loop resides within the microcontroller and is not explicitly shown) and the loop continues at 1012.

At 1024, the alarm sequence begins from 1010 (low battery) or from 1018 ("trmax" elapsed). The alarm may have multiple settings for producing distinct sounds for the conditions of low battery and "trmax" elapsed (child in left car). Also, the warning for the "trw" elapsed state may be provided by the same alarm 44. In the alarm sequence, the alarm 44 is turned on and remains on until at 1026 the primary batteries 914 are replaced or recharged (when activated due to a low battery condition), or until the logical bit R2 is changed to "0" responsive to operation of the disable switch 48 or detection of the disable signal S2 (when activated due to "trmax" elapsed).

Upon disablement of the system 1000 at 1026 or at 1014, the indicator 46 is turned off and the system 1000 is returned to the standby loop at 1002. The operational process flow 1000 of the system 900 continues in this way, awaiting the next time the monitoring signal S1 is received by the receiver 904.

In the first exemplary embodiment just described, the monitoring and alarm system 10 is provided as an add-on kit for use with an existing child seat 12. To install the system 10, the sensor mat 22 of the detector assembly 20 is placed on the seat portion of the child seat 12, the base unit 30 is mounted to or in the proximity of the child seat, and the portable unit keychain fob 40 is connected to the user's keychain. The base unit 30 may be mounted to the vehicle sun visor by the clip 38 or another conventional fastener, to the base of the child seat 12 by hook-and-loop fasteners, adhesive strips, screws, or other conventional fasteners, or to another component of the vehicle of child seat.

For this and other embodiments of the invention, the detector assembly 20, the base unit 30, and the portable unit keychain fob 40 can be provided separately as replacement parts for use with an existing system. In this way, if a person loses his or her keys (and the fob 40) or drops and damages the base unit 30, or if the infant repeatedly soils the sensor mat 22, then the user can purchase only the needed replacement component or components.

In addition, the system 10 can be factory built into new vehicles, with the detector assembly 20 manufactured into the back seat, the base unit 30 built into or mountable onto the sun visor, the dash board, or another vehicle component, and the portable unit keychain fob 40 provided with the new vehicle keys. In this arrangement, the sensor 22 of the detector assembly 20 can be calibrated to account for the weight of the car seat 12 on it, so that additional weight would indicate the presence of the child.

Figure 11:
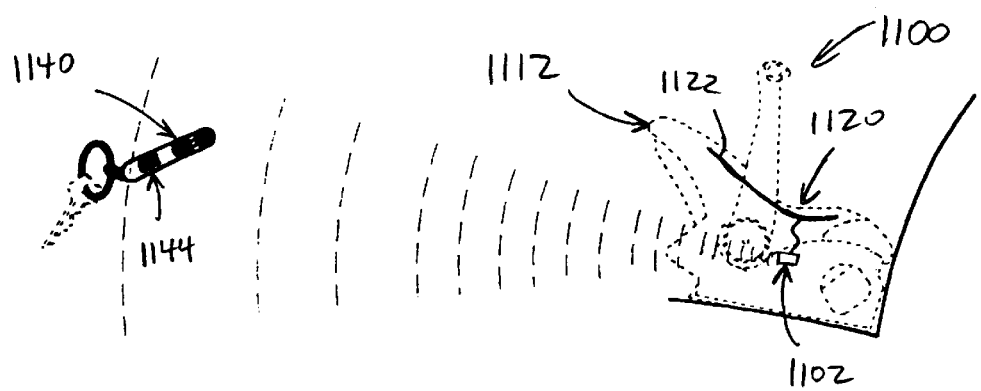
FIG. 11 is a schematic diagram of a child-proximity monitoring and alarm system according to a second exemplary embodiment for use with a unitary child seat, showing a detector assembly on the child seat and a keychain fob.

Turning now to FIG. 11, there is shown a second exemplary embodiment according to the invention, referred to as the child-proximity monitoring and alarm system 1100. In this embodiment, the system 1100 is simplified for use with a unitary child seat 1112 in which the shell is not detachable from the base. Of course, the same system 1100 can be used with two-piece or other types of car seats 1112, if so desired.

For use with a unitary child seat 1112, there is no need for the proximity-sensitive indication of whether the shell is mounted to or in proximity to the base. So the detector assembly 1120 includes the sensor 1122 and the transmitter 1102 that transmits to the portable unit 1140 the proximity-sensitive indication that the car seat 12 is occupied. The transmitter 1102 may be mounted to the base of the car seat 12 or elsewhere, and electrically communicates with the sensor 1122 by wires or wirelessly. And the portable unit 1140 includes the alarm 1144 and the receiver that receives the proximity-sensitive indication from the detector assembly transmitter 1102.

In this way, the detector assembly 20 and the base unit 30 of the first embodiment are essentially combined into a single functional unit, which permits the elimination of a number of components in the simplified system 1100. Components that can be eliminated include the receiver function of the base unit 30, the transmitter function of the detector assembly 20, and redundant components such as microcontrollers, antennas, indicator lights, alarms, amplifiers, and batteries. The transmitter function of the base unit 30 is provided in the simplified system 1100 by the transmitter 1102 of the detector assembly 1120.

Figure 12:
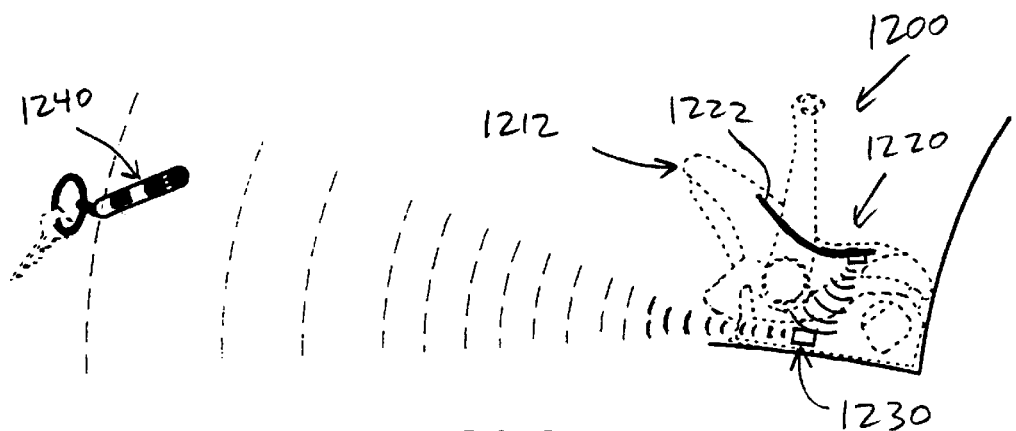
FIG. 12 is a schematic diagram of a child-proximity monitoring and alarm system according to a third exemplary embodiment that is integrally provided with a child seat, showing the detector assembly and the base unit integrally provided with the child seat.

Turning now to FIG. 12, there is shown a third exemplary embodiment according to the invention, referred to as the child-proximity monitoring and alarm system 1200. In this embodiment, the system 1200 is made and sold integrally with the child seat 1212. Thus, the sensor mat 1222 is built into the seat portion of the child seat 1212, immediately on its top surface or embedded into the seat cushion. Similarly, the base unit 1230 is built into the base of the child seat 1212 so that it is unobtrusive, in a housing integrally formed with the base or in a separate housing mounted to it. Of course, the components of the system 1200 can be built into other parts of the child seat 1212, as may be desired for different child seats. And although the system 1200 is shown having components similar to those of the first exemplary embodiment, the system can be provided with components similar to those of the second or other embodiments.

Figures 13A, 13B, 14:
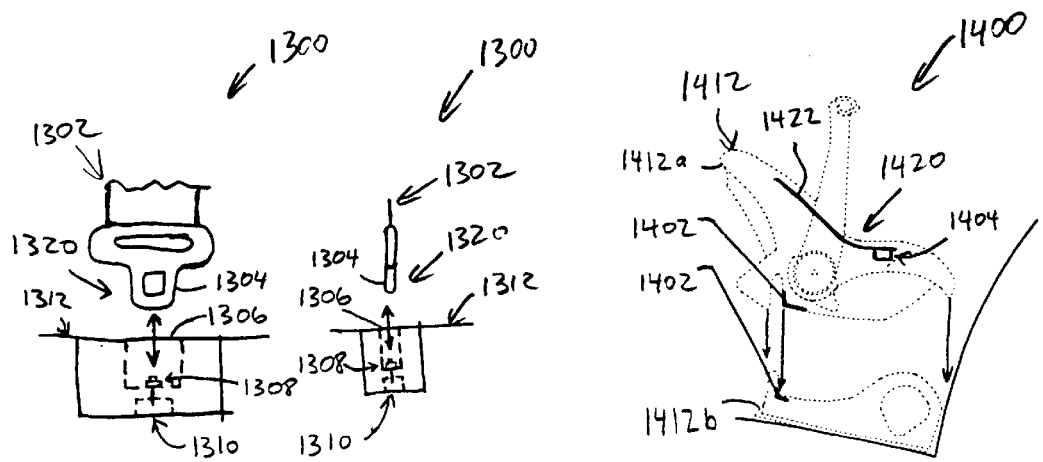
FIG. 13A is a front view of a portion of a fourth exemplary embodiment similar to the system of FIG. 12, showing the sensor provided by a switch for detecting whether the seat belt of the child seat is connected.
FIG. 13B is a side view of the portion of the sensor of the system of FIG. 13A.
FIG. 14 is a side view of a portion of a fifth exemplary embodiment for use with two-piece child seats, showing a second sensor for detecting whether the child seat shell is mounted to its base.

Turning now to FIGS. 13A and 13B, there is shown a portion of a fourth exemplary embodiment according to the invention, referred to as the child-proximity monitoring and alarm system 1300. In this embodiment, the system 1300 is provided integrally with the child seat like the third exemplary embodiment, and it includes the major components of the first or second exemplary embodiments, except that a different sensor 1320 is provided. Instead of the weight-sensitive mat, the sensor 1320 is provided by a switch configured for determining if a seat belt 1302 of the child seat 1312 is connected. The switch 1320 includes the male and female connectors 1304 and 1306 of the seat belt 1302. A pushbutton 1308 is mounted in the opening of the female connector 1306 so that the pushbutton is depressed by the male connector 1304 when inserted into the female connector. Alternatively, the male and female connectors 1304 and 1306 can be configured so that when they are connected they contact and conduct electricity, or other open/close switch configurations can be provided. Also, the switch 1320 includes a jack 1310 for connecting wires between the switch and the transmitter of the detector assembly. Alternatively, the transmitter can be positioned immediately adjacent or integrally with the female end connector 1306 so that the jack is not needed.

The switch 1320 is "open" when the seat belt connectors 1304 and 1306 are disconnected, indicating that the child seat 1312 is unoccupied. And the switch 1320 is "closed" when the seat belt connectors 1304 and 1306 are connected, indicating that the child seat 1312 is occupied. Accordingly, the transmitter sends the active signal S3 only when the seat belt connectors 1304 and 1306 are connected. Since most parents keep the seat belt 1302 disconnected so they can more easily put their child in the car seat 1312, and always connect the seat belt when the child is in the child seat, this arrangement provides an appropriate child-sensing indication.

Turning now to FIG. 14, there is shown a portion of a fifth exemplary embodiment according to the invention, referred to as the child-proximity monitoring and alarm system 1400. In this embodiment, the system 1400 is provided integrally with the child seat like the third exemplary embodiment, and it includes the major components of the second exemplary embodiment. In addition, a second sensor 1402 determines if the detachable shell 1412a of the car seat 1412 is mounted to the base 1412b, and communicates this via the transmitter 1404 of the detector assembly 1420 to the portable unit (not shown). The second sensor 1402 may be provided by a pair of mating contacts mounted to the base 1412b and the shell 1412a, a pushbutton mounted to the underside of the shell 1412a that is depressed by the base 1412b when the shell is mounted to the base, or by other conventional switching mechanisms.

The control system of the detector assembly 1420 and/or the portable unit activates the corresponding alarm to alert the caretaker if the shell 1412a is removed from the base 1412b, based on input from the second sensor 1402, while the child seat 1412 is occupied, based on input from the sensor 1422 of the detector assembly 1420. In this way, the system 1400 can be used with two-piece car seats 1412 without including the base unit of the first embodiment.

In addition, a number of other embodiments of the invention may be provided. In one alternative embodiment, a child-proximity and monitoring system is provided with two portable unit keychain fobs for use with one base unit, so that either parent can drive the car with the child seat in it. In another alternative embodiment, the system is provided with multiple base units operable with a single keychain fob, so that a parent with more than one child can use multiple child seats and only need one fob. And in still another embodiment, the system is provided with two (or more) keychain fobs for use with two (or more) base units, so that either parent can use their fob with either of their cars, regardless of which of the child seats is in that car. Of course, other variations of the number of the major components included in the system can be provided.

In yet another alternative embodiment, the sequence of proximity-sensitive communications is from base unit to detector assembly to portable unit, instead of from detector assembly to base unit to portable unit. This is somewhat similar to the configuration provided in the fifth exemplary embodiment. And in other embodiments the system is adapted for use in monitoring the presence of a pet in a vehicle and providing an alarm to prevent leaving the pet in the car. In one such embodiment, the sensor is provided, for example, by a weight-sensitive mat in a pet carrier. In another such embodiment the carrier is the vehicle itself and the sensor determines whether the pet is in it by, for example, a proximity indication scheme implemented by additionally providing a transmitter, transceiver, or other device attached to the pet collar. It will be understood that the system can be adapted for use in proximity-sensitive monitoring of other objects under other circumstances.

Accordingly, the present invention provides a child-proximity monitoring and alarm system that notifies a parent or other caretaker when about to unintentionally leave a child in a vehicle. Advantageously, the keychain fob or other portable unit has proximity-sensitive capabilities and an alarm for alerting the parent when leaving the proximity of the car while the child is still in the car seat. Furthermore, to avoid false alarms when used with two-piece car seats, the system is implemented with a base unit for relaying proximity-sensitive communications from the detector assembly to the keychain fob. In addition, the system can be provided as an add-on kit for use with an existing child car seat or it can be built into and provided with a new child seat, whether the child seat is the unitary or two-piece type. Moreover, the various embodiments of the invention are efficient to manufacture, install, and use.

In the embodiments described above and in the following claims, the words "a," "an," and "one" are not intended to mean "only one" but can also mean any number greater than one. Similarly, plural terms are sometimes used for convenience and are not necessarily intended to mean "more than one" but can also mean just "one." While the invention has been shown and described in exemplary forms, it will be apparent to those skilled in the art that many modifications, additions, and deletions can be made therein without departing from the spirit and scope of the invention as set forth in the following claims.

What is claimed is:

1. An object-proximity monitoring and alarm system for use with an object carrier, comprising:
   at least one sensor adapted to determine whether the object carrier is occupied;
   a main transmitter in communication with the sensor; and
   a portable unit including a receiver and an alarm,
   wherein the main transmitter is operable to communicate to the portable unit receiver whether the object carrier is occupied based on input from the sensor, and the portable unit is operable to activate the alarm if the object carrier is occupied and the receiver is removed beyond a first predetermined proximity range of the main transmitter.

2. The object-proximity monitoring and alarm system of claim 1, wherein the sensor comprises a weight-sensitive mat.

3. The object-proximity monitoring and alarm system of claim 1, wherein the portable unit comprises a keychain fob housing the alarm and the receiver.

4. The object-proximity monitoring and alarm system of claim 1, wherein:
   the main transmitter is operable to intermittently transmit a first electromagnetic signal responsive to the input from the sensor that the object carrier is occupied, and to transmit a second electromagnetic signal responsive to the input from the sensor that the object carrier ceases to be occupied; and
   the portable unit is operable to receive the first and second electromagnetic signals, and to activate the alarm if more than a predetermined length of time passes between successive receptions of the first electromagnetic signal, unless one of the second electromagnetic signals is received in the predetermined length of time.

5. The object-proximity monitoring and alarm system of claim 4, wherein the main transmitter is operable to transmit the first signal with a strength that is receivable by the portable unit receiver only within the first predetermined proximity range so that the alarm is activated if the portable unit is moved beyond the first proximity range of the main transmitter.

6. The object-proximity monitoring and alarm system of claim 5, further comprising:
   a detector assembly including the sensor and a second transmitter operable to transmit a third electromagnetic signal with a strength that is receivable only within a second predetermined proximity range; and
   a base unit including a transceiver comprising the main transmitter and a second receiver,
   wherein the portable unit is operable to activate the alarm only if the third signal is being received by the second receiver of the transceiver so that the portable unit alarm can be activated only if the base unit is within the second proximity range of the detector assembly.

7. The object-proximity monitoring and alarm system of claim 1, further comprising:
   a transceiver including the main transmitter and a second receiver; and
   a second transmitter operable to transmit a third electromagnetic signal, wherein the portable unit is operable to activate the alarm only if the third signal is being received by the second receiver of the transceiver.

8. The object-proximity monitoring and alarm system of claim 1, further comprising:
   a detector assembly including the sensor; and
   a base unit in a proximity-sensitive relationship with the detector assembly,
   wherein the portable unit is operable to activate the alarm only if the detector assembly and the portable unit are within a predetermined proximity range of each other.

9. The object-proximity monitoring and alarm system of claim 8, wherein the base unit includes a transceiver comprising the main transmitter and a second receiver, the detector assembly includes a second transmitter operable to transmit a third electromagnetic signal, and the portable unit is operable to activate the alarm only if the third signal is being received by the second receiver of the transceiver.

10. The object-proximity monitoring and alarm system of claim 9, wherein the second transmitter of the detector assembly is operable to transmit the third electromagnetic signal responsive to the input from the sensor that the object carrier is occupied.

11. The object-proximity monitoring and alarm system of claim 9, wherein the second transmitter of the detector assembly is operable to transmit the third electromagnetic signal with a strength that is receivable by the second receiver of the base unit transceiver only within a second predetermined proximity range so that the portable unit is operable to activate the alarm only if the base unit is within the second proximity range of the detector assembly.

12. The object-proximity monitoring and alarm system of claim 1 in combination with the object carrier.

13. The object-proximity monitoring and alarm system of claim 12, wherein the object carrier comprises a child seat securable within a vehicle.

14. The object-proximity monitoring and alarm system of claim 13, wherein the child seat comprises a base and a shell detachably mounted to the base, and further comprising at least one second sensor adapted to determine if the shell is mounted to the base, wherein the portable unit is operable to activate the alarm only upon a determination by the second sensor that the shell is mounted to the base.

15. The object-proximity monitoring and alarm system of claim 13, wherein the sensor comprises a switch configured for determining if a seat belt of the child seat is connected.

16. A child-proximity monitoring and alarm system for use with a child seat securable within a vehicle, comprising:
   a detector assembly including a sensor and a second transmitter, wherein the sensor includes a weight-sensitive mat adapted to determine whether the child seat is occupied and the second transmitter is operable to transmit a first indication that the child seat is occupied responsive to input from the sensor;
   a base unit including a transceiver operable to receive the first indication that the child seat is occupied and, responsive thereto, to transmit a second proximity-sensitive indication that the child seat is occupied; and a keychain fob housing an alarm and a receiver operable to receive the second proximity-sensitive indication that the child seat is occupied and to activate the alarm if the fob receiver is removed beyond a first predetermined proximity range of the main transmitter while the child seat is occupied, wherein the base unit is configured to transmit the first proximity-sensitive indication that the child seat is occupied only if the child seat is within a second predetermined proximity range of the base unit.

17. The child-proximity monitoring and alarm system of claim 16, wherein the detector assembly second transmitter is operable to transmit a third electromagnetic signal responsive to the input from the sensor that the child seat is occupied, and the base unit transceiver is operable to transmit the first proximity-sensitive indication that the child seat is occupied only if the third electromagnetic signal is being received.

18. The child-proximity monitoring and alarm system of claim 17, wherein the detector assembly second transmitter is operable to transmit the third electromagnetic signal with a strength that is receivable by the transceiver only within the second predetermined proximity range so that the keychain fob receiver is operable to activate the alarm only if the base unit is within the second proximity range of the detector assembly.

19. The child-proximity monitoring and alarm system of claim 17, wherein:

the transceiver is operable to intermittently transmit a first electromagnetic signal if the third signal is being received and to transmit a second electromagnetic signal if the third signal is not being received; and the keychain fob receiver is operable to receive the first and second electromagnetic signals and to activate the alarm if more than a predetermined length of time passes between successive receptions of the first electromagnetic signal, unless one of the second electromagnetic signals is received in the interim.

20. The child-proximity monitoring and alarm system of claim 19, wherein the transceiver is operable to transmit the first signal with a strength that is receivable by the keychain fob receiver only within a first predetermined proximity range so that the alarm is activated if the keychain fob is moved beyond the first proximity range of the base unit.

21. The child-proximity monitoring and alarm system of claim 16 in combination with the child seat.

22. The child-proximity monitoring and alarm system of claim 21, wherein the child seat comprises a base and a shell detachable from the base, and the sensor is included in or positionable on the child seat shell and the base unit is included in or positionable in proximity to the child seat base.

23. A child-proximity monitoring and alarm system for use with a child seat securable within a vehicle, comprising:

at least one sensor including a weight-sensitive mat adapted to determine whether the child seat is occupied;

a main transmitter in communication with the sensor and operable to intermittently transmit a first electromagnetic signal responsive to input from the sensor that the child seat is occupied, and to transmit a second electromagnetic signal responsive to input from the sensor that the child seat ceases to be occupied; and a keychain fob housing an alarm and a receiver operable to receive the first and second electromagnetic signals and to activate the alarm if more than a predetermined length of time passes between successive receptions of the first electromagnetic signal, unless one of the second electromagnetic signals is received in the interim, wherein the main transmitter is operable to transmit the first signal with a strength that is receivable by the keychain fob receiver only within a first predetermined proximity range so that the alarm is activated if the keychain fob is moved beyond the first proximity range of the main transmitter.

24. The child-proximity monitoring and alarm system of claim 23 in combination with the child seat.

25. The child-proximity monitoring and alarm system of claim 24, wherein the child seat comprises a base and a shell detachable from the base, the sensor is included in or positionable on the child seat shell, and the main transmitter is included in or positionable in proximity to the child seat base.

26. A portable unit for use in a child-proximity monitoring and alarm system used with a child seat securable within a vehicle, the monitoring and alarm system including at least one sensor adapted to determine whether the child seat is occupied and a main transmitter operable to transmit a proximity-sensitive indication that the child seat is occupied based on input from the sensor, the portable unit comprising:

a receiver operable to receive from the main transmitter the proximity-sensitive indication that the child seat is occupied; and an alarm operable to activate responsive to the receipt of the proximity-sensitive indication that the child seat is occupied if the portable unit receiver is removed beyond a first predetermined proximity range of the main transmitter.

27. The portable unit of claim 26, wherein:

the receiver is operable to receive from the main transmitter intermittent transmissions of a first electromagnetic signal responsive to the input from the sensor that the child seat is occupied, and to receive from the transmitter a second electromagnetic signal responsive to the input from the sensor that the child seat ceases to be occupied; and the alarm is operable to activate if more than a predetermined length of time passes between successive receptions of the first electromagnetic signal, unless one of the second electromagnetic signals is received in the interim.

28. The portable unit of claim 26, wherein the portable unit comprises a keychain fob.

29. A base unit for use in a child-proximity monitoring and alarm system used with a child seat securable within a vehicle, the monitoring and alarm system including a sensor, a second transmitter operable to transmit a first indication that the child seat is occupied based on input from the sensor, and a portable unit comprising a receiver and an alarm, the base unit comprising:

a transceiver operable to receive the first indication from the second transmitter that the child seat is occupied based on the input from the sensor and, responsive thereto, to transmit a second proximity-sensitive indication that the child seat is occupied that is receivable by the portable unit receiver only within a first predetermined proximity range, wherein the alarm is activated if the portable unit is removed beyond the first predetermined proximity range of the transceiver.

30. The base unit of claim 29, wherein the transceiver is operable to receive from the second transmitter a third electromagnetic signal responsive to the input from the sensor that the child seat is occupied, and to intermittently transmit a first electromagnetic signal if the third signal is being received and to transmit a second electromagnetic signal if the third signal is not being received, wherein the portable unit receiver receives the first and second electromagnetic signals and activates the alarm if more than a predetermined length of time passes between successive receptions of the first electromagnetic signal, unless one of the second electromagnetic signals is received in the interim.

31. The base unit of claim 30, wherein the transceiver is operable to receive the third electromagnetic signal only within a second predetermined proximity range of the second transmitter and to transmit the first signal with a strength that is receivable by the portable unit receiver only within the first predetermined proximity range of the of the transceiver so that the alarm can be activated if the portable unit is moved beyond the first proximity range of the transceiver but only if the transceiver remains within the second proximity range of the second transmitter.

32. A detector assembly for use in a child-proximity monitoring and alarm system used with a child seat securable within a vehicle, the monitoring and alarm system including a portable unit having a receiver operable to receive a proximity-sensitive indication that the child seat is occupied and an alarm operable to activate responsive thereto, the detector assembly comprising:

at least one sensor adapted to determine whether the child seat is occupied; and a transmitter operable to communicate to the portable unit receiver only within a first predetermined proximity range the proximity-sensitive indication that the child seat is occupied based on input from the sensor, wherein the alarm is activated if the portable unit is removed beyond the first predetermined proximity range of the transmitter.

33. The detector assembly of claim 32, wherein the transmitter is operable to transmit intermittent transmissions of a first electromagnetic signal responsive to the input from the sensor that the child seat is occupied, and to transmit a second electromagnetic signal responsive to the input from the sensor that the child seat ceases to be occupied, wherein the alarm activates if more than a predetermined length of time passes between successive receptions of the first electromagnetic signal, unless one of the second electromagnetic signals is received in the interim.

34. The detector assembly of claim 32, wherein the child-proximity monitoring and alarm system further includes a base unit comprising a transceiver, wherein the transmitter is operable to transmit a third electromagnetic signal responsive to the input from the sensor that the child seat is occupied and the third signal is receivable by the transceiver only within the first predetermined proximity range, wherein the transceiver transmits intermittent transmissions of a first electromagnetic signal if the third signal is received and transmits a second electromagnetic signal if the third signal is not received, and the alarm activates if more than a predetermined length of time passes between successive receptions of the first electromagnetic signal, unless one of the second electromagnetic signals is received in the interim.

35. The detector assembly of claim 32, wherein the sensor comprises a weight-sensitive mat.

36. An object-proximity monitoring and alarm system for use with an object carrier, comprising:

at least one sensor adapted to determine whether the object carrier is occupied;

a main transmitter in communication with the sensor; and a portable unit including a receiver and an alarm, wherein the main transmitter is operable to communicate at least two different electromagnetic signals to the portable unit receiver based on input from the sensor, the portable unit is operable to determine whether the object carrier is occupied by interpreting the at least two different electromagnetic signals, and the portable unit is further operable to activate the alarm if the object carrier is occupied and the receiver is removed beyond a first predetermined proximity range of the main transmitter by interpreting the at least two different electromagnetic signals.

* * * * *